United States Patent
Do et al.

(10) Patent No.: US 8,855,258 B1
(45) Date of Patent: Oct. 7, 2014

(54) TRANSMITTERS AND RECEIVERS USING A JITTER-ATTENUATED CLOCK DERIVED FROM A GAPPED CLOCK REFERENCE

(75) Inventors: Viet Do, Carlsbad, CA (US); Simon Pang, San Diego, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 420 days.

(21) Appl. No.: 13/250,794

(22) Filed: Sep. 30, 2011

Related U.S. Application Data (63) Continuation-in-part of application No. 13/091,052, filed on Apr. 20, 2011, now Pat. No. 8,666,011.

(51) Int. Cl.
    *H04L 7/00* (2006.01)
(52) U.S. Cl.
    USPC ........... 375/372; 375/371; 375/373; 375/374; 375/375; 375/376; 327/156; 327/157; 327/158; 327/159
(58) Field of Classification Search
    CPC ....... H04L 7/033; H04L 7/0337; H04J 3/0626
    USPC .................................................. 375/371–376
    See application file for complete search history.

(56) References Cited

U.S. PATENT DOCUMENTS

| | | | |
|---|---|---|---|
| 4,596,026 A | 6/1986 | Cease et al. | |
| 5,119,406 A | 6/1992 | Kramer | |
| 5,157,655 A | 10/1992 | Hamlin, Jr. et al. | |
| 5,471,511 A | 11/1995 | De Langhe et al. | |
| 6,501,809 B1 | 12/2002 | Monk et al. | |
| 6,927,716 B2 | 8/2005 | Keaveney et al. | |
| 7,986,190 B1* | 7/2011 | Lye | ................................ 331/1 A |
| 2003/0228150 A1 | 12/2003 | Dave | |
| 2007/0183551 A1 | 8/2007 | Ji et al. | |
| 2007/0291888 A1* | 12/2007 | Mateosky et al. | ............. 375/372 |

OTHER PUBLICATIONS

Silicon Labs, AN561, "Introduction to Gapped Clocks and PLLs" Rev. 0.1, 2010.

* cited by examiner

*Primary Examiner* — Daniel Washburn
*Assistant Examiner* — Eboni Hughes
(74) *Attorney, Agent, or Firm* — Amin, Turocy & Watson, LLP (57) ABSTRACT

A system and method are provided for resynchronizing a transmission signal using a jitter-attenuated clock derived from an asynchronous gapped clock. A first-in first-out (FIFO) memory accepts an asynchronous gapped clock derived from a first clock having a first frequency. The gapped clock has an average second frequency less than the first frequency. The input serial stream of data is loaded at a rate responsive to the gapped clock. A dynamic numerator (DN) and dynamic denominator (DD) are iteratively calculated for the gapped clock, averaged, and an averaged numerator (AN and an averaged denominator (AD) are generated. The first frequency is multiplied by the ratio of AN/AD to create a jitter-attenuated second clock having the second frequency. The FIFO memory accepts the jitter-attenuated second clock and supplies data from memory at the second frequency. A framer accepts the data from the FIFO memory and the jitter-attenuated second clock.

14 Claims, 11 Drawing Sheets

TRANSMITTERS AND RECEIVERS USING A JITTER-ATTENUATED CLOCK DERIVED FROM A GAPPED CLOCK REFERENCE

RELATED APPLICATIONS

This application is a Continuation-in-Part of a application entitled, JITTER-ATTENUATED CLOCK USING GAPPED CLOCK REFERENCE, invented by Viet Do et al., Ser. No. 13/091,052, filed Apr. 20, 2011 now U.S. Pat. No. 8,666,011, which is incorporated herein by reference.

BACKGROUND OF THE INVENTION

1. Field of the Invention

This invention generally relates to a digital communication system and, more particularly, to a system and method for using a jitter-attenuated clock derived from a gapped clock source for transmitter and receiver applications.

2. Description of the Related Art

As noted in Silicon Laboratories Application Note AN561, synchronous networks have a hierarchical approach to distributing network timing. They do this by establishing a timing master and slaving the various sub networks and nodes to the master. This approach has met with success for SONET/SDH and packet-based wide area networks.

In contrast, local area networks tend to generate timing locally and slave the immediate receiver's timing to the transmit timing of the driving node. The transmitting node's timing is often completely asynchronous to the timing of its receiver. Two examples of these two distinct approaches are SONET and Ethernet, though neither uses purely a single approach.

SONET typically synchronizes everything to one timing master and distributes timing in a hierarchical manner. However, transport paths can experience jitter and wander with magnitudes that can be greater than one UI (unit interval or the period of the clock frequency), while some payloads cannot be made synchronous and must remain plesiochronous.

The solution that SONET has adopted is payload pointers, which embed the frame slip information into the overhead portion of the SONET frame. Pointer processing is a very effective method of embedding plesiochronous payloads in synchronous SONET frames, but as the SONET data rates have increased over the year, pointer processing has become more and more difficult to implement in FPGAs and ASICs.

Conventionally, every Ethernet transmitter runs at a rate that is determined by its local and individual timing source, which is usually a crystal oscillator, a free running clock with ±100 ppm accuracy. The receiving node slaves its timing to the transmitting source using the isochronous timing information that is embedded in the Ethernet data stream. This approach is both efficient and inexpensive. However, one consequence is that timing mismatches between the various asynchronous nodes can accumulate and result in bit errors and dropped packets. This is not a serious issue for the data payloads that Ethernet is intended to carry because the higher level IP protocols implement frame error detection and retransmission. However, as voice payloads have become more common, the situation is more complicated because packet retransmission interrupts the steady flow required for good voice sound quality. Synchronous Ethernet (SyncE) and Timing Over Packet (IEEE-1S88) are two methods of distributing synchronization through packet networks so that they can interoperate with conventional circuit switches services, such as SONET/SDH.

The solution that is used by OTN/OTU is a compromise between SONET and Ethernet in that it is specifically designed to accept plesiochronous payloads and efficiently place them in containers that are ready for optical transmission over long distances. The timing master for an OTN/OTU node can be asynchronous, and the OTN/OTU wrapper can accept payloads from a variety of sources. It is quite common for OTN/OTU systems to use gapped clocks to achieve these goals.

Figure 1:
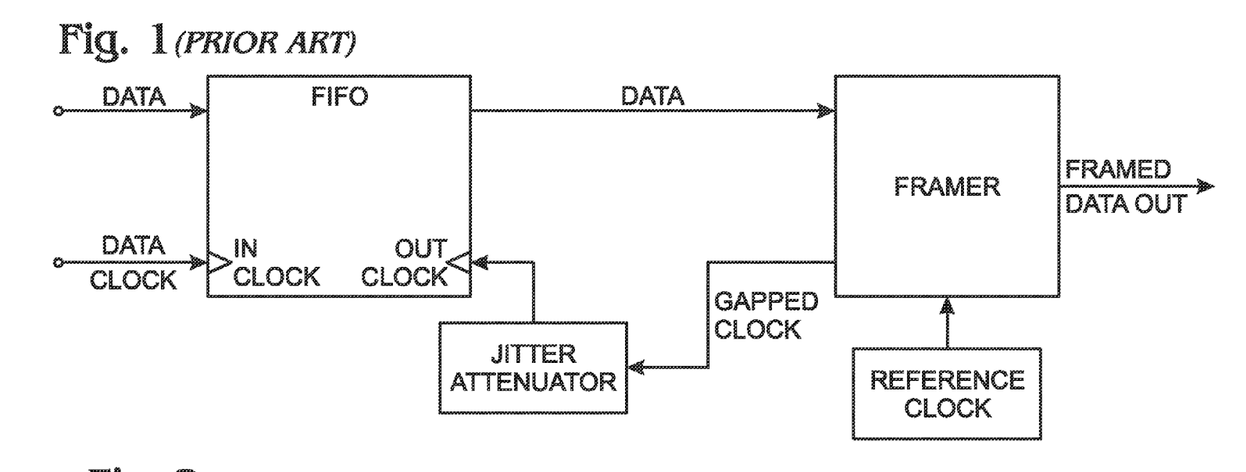
FIG. 1 is a schematic block diagram depicting a transmitter using a gapped clock (prior art).

FIG. 1 is a schematic block diagram depicting a transmitter using a gapped clock (prior art). Gapped clocks are periodic clock signals of a single clock frequency that have clock pulses removed from their stream. Well-formed gapped clocks do not have reduced width pulses (known as runt pulses). Rather, each individual clock pulse is either completely present or completely absent. In a typical application, one in N clock pulses is removed, where N can be a constant or can be constrained to be within a range of values. Advantageously, the reference frequency can be used to create the gapped clock, varying the gapped clock frequency in response to the number of removed clock pulses, at the cost of some irregular periods (gaps) between clock pulses.

As shown in FIG. 1, the data source is plesiochronous with respect to the transmission output rate. That is, the reference clock can be implemented with an XO or a TXCO that is not locked to anything, including the data source clock. The data source clock and data go into a FIFO so that data comes in at a uniform rate, and is clocked out of the FIFO with a clock that is aperiodic, i.e. gapped.

The purpose of the framer is to add FEC (forward error correction), framing, and other overhead bits that are needed to create a wrapper that conforms to whatever convention or protocol is in use. For this to function properly, the output clock rate must be higher than the data source clock rate because bits are being added to the stream.

Figure 2:
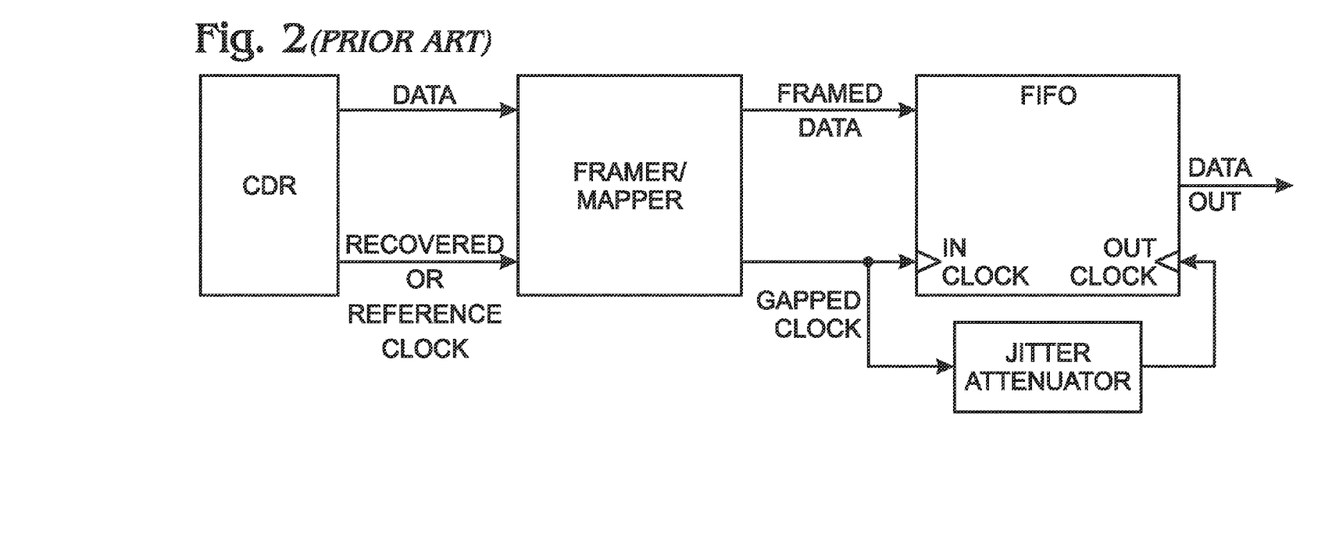
FIG. 2 is a schematic block diagram of a Clock Data Recovery (CDR) receiver using a gapped clock (prior art).

FIG. 2 is a schematic block diagram of a Clock Data Recovery (CDR) receiver using a gapped clock (prior art). The CDR separates the isochronous data stream into clock and data signals. Since the input clock to the FIFO only occurs for payload bits, only the payload bits enter the FIFO. The FIFO input clock is not strictly periodic (by virtue of it being gapped). Since downstream consumers of the output data are not usually tolerant of gapped clocks, a jitter attenuator is used to create a clock output that has the same average frequency as the gapped clock with less jitter. The use of a jitter attenuator in the systems of FIGS. 1 and 2 adds considerably to their expense and size.

It would be advantageous if a means existed for creating a jitter-attenuated clock derived from a gapped clock source for transmit and receive applications.

SUMMARY OF THE INVENTION

Described herein are a system and method for dynamically acquiring integer derivatives of a positive, negative, or a positive/negative combination gapped clock frequency, which may for example, be used with a phase-locked loop (PLL) to enable jitter attenuation. Such a system is useful in a synchronizer/desynchronizer with synchronous/asynchronous mapping/demapping for communication applications. Therefore, complex mapping/demapping protocols can be implemented.

Accordingly, a method is provided for resynchronizing a transmission signal using a jitter-attenuated clock derived from an asynchronous gapped clock. A first-in first-out (FIFO) memory accepts an asynchronous gapped clock derived from a first clock having a first frequency. The gapped clock has an average second frequency less than the first frequency. The input serial stream of data is loaded at a rate responsive to the gapped clock. A dynamic numerator (DN) and dynamic denominator (DD) are iteratively calculated for the gapped clock. Then, DN and DD are averaged. In response to the averaging, an averaged numerator (AN) and an averaged denominator (AD) are generated. Finally, the first frequency (first reference clock) is multiplied by the ratio of AN/AD to create a jitter-attenuated second clock having the second frequency. The FIFO memory accepts the jitter-attenuated second clock and supplies data from memory at the second frequency. A framer accepts the data from the FIFO memory and the jitter-attenuated second clock. The data is synchronized with the jitter-attenuated second clock, creating a serial stream of output data, and transmitted at an output.

The first reference clock is accepted as a sequence of frames, where each frame includes (n) clock cycles. The gapped clock is generated by dividing (n) by an integer number (x) of instantaneous gap clock periods (IGCPs), where the total number of clock gaps in the (x) IGCPs is (m). A divided clock is generated with a uniform minimum divide period of (MD), and DN is found by calculating:

$$(x)(MD)+(m)=(n), \text{ when } (x)(MD) \geq n; \text{ and,}$$

$$(x)(MD)-(m)=(n), \text{ when } (x)(MD) < n.$$

DN is iteratively calculated by finding the difference between (n) and (m) for each frame. DD is iteratively calculated by finding (n) for each frame.

Additional details of the above-described method, a framing system for transmission, and a receiver system for resynchronizing a received signal are provided below.

DETAILED DESCRIPTION

Figure 8:
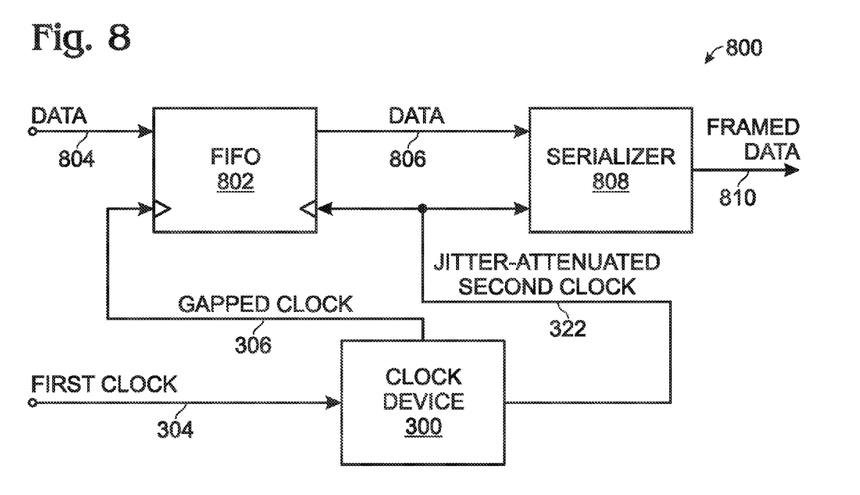
FIG. 8 is a schematic block diagram of a framer system for transmitting a signal using a jitter-attenuated clock derived from an asynchronous gapped clock.

FIG. 8 is a schematic block diagram of a framer system for transmitting a signal using a jitter-attenuated clock derived from an asynchronous gapped clock. The framer system 800 comprises a first-in first-out (FIFO) memory 802 having an input interface on line 306 to accept an asynchronous gapped clock, and an input on line 804 to accept a serial stream of data. The serial stream of data is loaded at a rate responsive to the gapped clock. The framer system 800 further comprises a clock device 300, as explained in more detail below.

Figure 3:
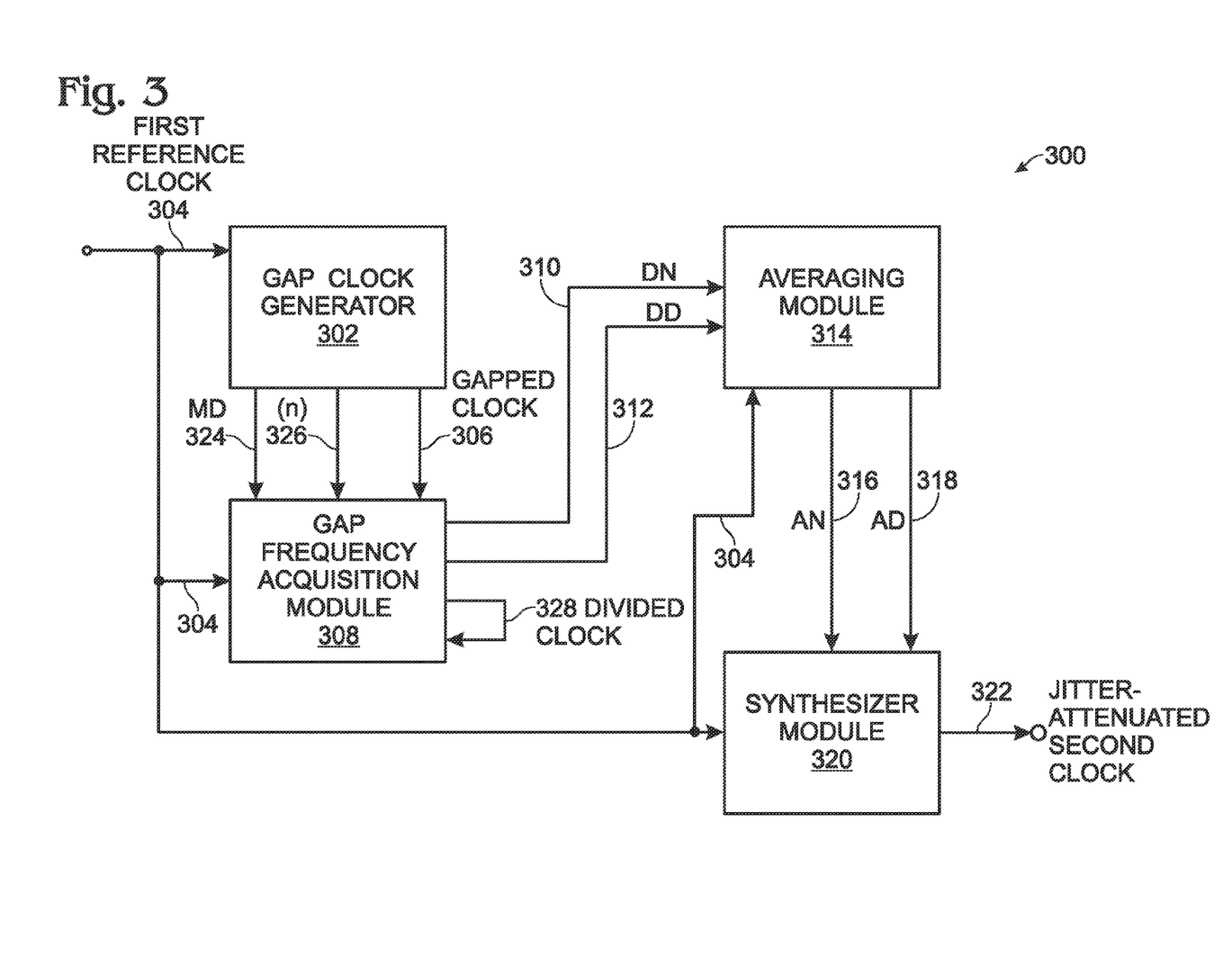
FIG. 3 is schematic block diagram of a clock device with a system for generating a jitter-attenuated clock using an asynchronous gap clock generator.

FIG. 3 is schematic block diagram of a clock device with a system for generating a jitter-attenuated clock using an asynchronous gap clock generator. The clock device 300 comprises a gap clock generator 302 having an input on line 304 to accept a first reference clock having a first frequency. The gap clock generator 302 has an output on line 306 to supply the asynchronous gapped clock with an average second frequency less than the first frequency. The system is not limited to any particular means of generating a gapped clock. A gap frequency acquisition module 308 has an input on line 306 to accept the gapped clock. The gap frequency acquisition module 308 has outputs on line 310 and 312 to respectively supply an iteratively calculated dynamic numerator (DN) and an iteratively calculated dynamic denominator (DD) for the gapped clock.

An averaging module 314 has inputs on lines 310 and 312 to accept the DN and DD, and outputs on lines 316 and 318 to respectively supply an averaged numerator (AN) and an averaged denominator (AD). A synthesizer module 320 has inputs on lines 316 and 318 to accept AN, AD, and the first frequency clock on line 304. The synthesizer module 320 multiplies the first frequency by the ratio AN/AD to supply a jitter-attenuated second clock on line 322 having the second frequency. A jitter-attenuated clock is defined herein as having a uniform clock pulse period, or a uniform spacing between clock pulses.

Returning to FIG. 8, the FIFO memory 802 has an input interface on line 322 to accept the jitter-attenuated second clock and an output interface on line 806 to supply data from memory at a rate responsive to the second clock frequency. A serializer or framer 808 has an input interface on line 322 to accept the jitter-attenuated second clock and an input interface on line 806 to accept data from the FIFO memory 802. The serializer 808 synchronizes the data with the jitter-attenuated second clock, adds digital wrappers, and transmits a serial stream of output data at an output interface on line 810. The type of digital wrapper added depends on the format and protocol being used to transmit the data. Typically, the digital wrapper includes overhead information used to identify the frames (the wrapper).

Figure 9:
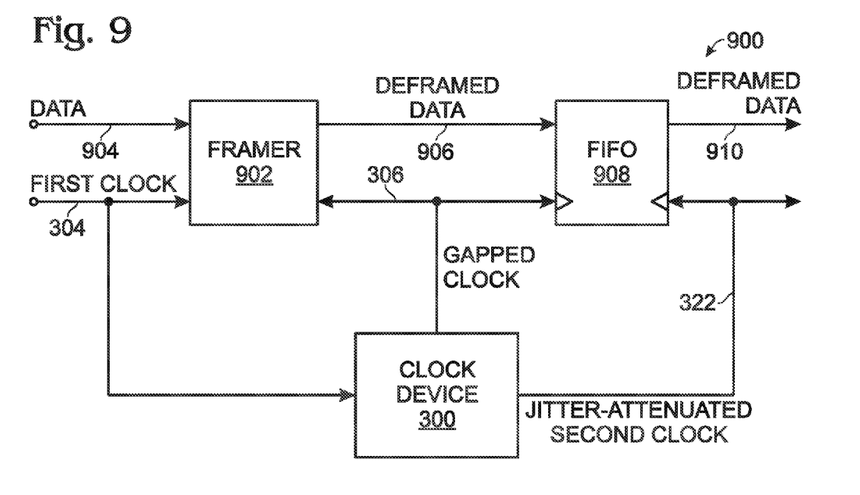
FIG. 9 is a schematic block diagram of a gapped clock receiver system for resynchronizing a received signal using a jitter-attenuated clock derived from an asynchronous gapped clock.

FIG. 9 is a schematic block diagram of a gapped clock receiver system for resynchronizing a received signal using a jitter-attenuated clock derived from an asynchronous gapped clock. The receiver system 900 comprises a framer or mapper 902 having an input interface on line 304 to accept a first reference clock having a first frequency, an interface on line 904 to accept a serial stream of data, and an input on line 306 to accept an asynchronous gapped clock having an average second frequency less than the first frequency. In one aspect, the gap clock generator may be embedded in the framer. The data and first clock may be supplied by a clock and data recovery (CDR) device (not shown). The framer 902 removes digital wrappers from the serial stream of data and supplies deframed data at an output interface on line 906 at a rate responsive to the gapped clock. The receiver system 900 also uses the clock device depicted in FIG. 3. The functions of the gap clock generator, gap frequency acquisition module, averaging module, and synthesizer module are the same as explained above, and are not repeated here in the interest of brevity.

Receiver system 900 further comprises a FIFO memory 908 having an input interface on line 906 to accept the deframed data and an input interface on line 306 to accept the gapped clock. The FIFO 908 loads the deframed data at a rate responsive to the gapped clock. The FIFO memory 908 has an interface to accept the jitter-attenuated second clock on line 322 and an output interface on line 910 to supply deframed data from memory at a rate response to the jitter-attenuated second clock.

Returning to FIG. 3, in one aspect the gap clock generator 302 accepts a first reference clock with a frame of (n) clock cycles, and generates the gapped clock by dividing (n) by an integer number (x) of instantaneous gap clock periods (IGCPs), where the total number of clock gaps in the (x) IGCPs is (m). Typically, the frequency of the gapped clock is unknown (not predetermined). It is also typical that that gapped clock pulses do not occur in predetermined patterns or locations in a frame. In some aspect, the value of (n) is predetermined and remains constant. However, the value of n may be non-predetermined, and in some aspects may vary from frame-to-frame.

In one aspect, the averaging module 314 accumulates values of DN and DD over a plurality of (s) frames, and divides the accumulated values by (s). For example, the averaging module can be a first-in first-out (FIFO) memory having the capacity for at least (s) number of DN and DD values, together with calculation logic capable of summing the DN values and dividing by (s). Likewise, the calculation logic would be capable of summing the DD values and dividing by (s).

In another aspect, the gap clock generator 302 has an output on line 324 to supply a uniform minimum divide period of (MD), and an output on line 326 to supply the value of (n) for each frame. The gap frequency acquisition module 308 generates a divided clock on line 328 with the uniform minimum divide period (MD). Then, the gap frequency acquisition module 308 calculates:

$(x)(MD)+(m)=(n)$, when $(x)(MD) \geq n$; and, $(x)(MD)-(m)=(n)$, when $(x)(MD) < n$.

More explicitly, the value DN is iteratively calculated for each frame by finding the difference between (m) and (n). The value DD is iteratively calculated by determining (n) for each frame. It should be understood that the system 300 is not necessarily required to generate or use the divided clock, as there are other means of determining the value of (m).

In one aspect, the gap clock generator 302 supplies a positive gapped clock having a lower frequency than the divided clock. The gap frequency acquisition module 308, over the period of a frame, finds a difference in first reference clock pulses between each IGCP and a corresponding MD, and sums the differences to obtain the value (m). Examples of positive and negative gapped clocks are presented in detail below. Alternatively, if the gap clock generator 302 supplies a negative gapped clock having a higher frequency than the divided clock, the gap frequency acquisition module 308, over the period of a frame, finds a difference in first reference clock pulses between each IGCP and a corresponding MD, and sums the differences to obtain the value (m).

In another aspect, the gap clock generator 302 supplies a gapped clock with negative gapped clock portions having a higher frequency than the divided clock, and positive gapped clock portions with a lower frequency than the divided clock. Then, the gap frequency acquisition module 308, over the period of a frame, finds a first difference sum in first reference clock pulses between each negative gapped clock portion IGCP and a corresponding MD. The gap frequency acquisition module also finds a second difference sum between each positive gapped clock portion IGCP and a corresponding MD, and subtracts the first difference from the second difference to obtain the value (m).

Functional Description

The gapped clock generator 302 receives a low jitter clock (e.g., from a CDR recovery clock) to generate a gapped clock for a synchronizer or a desynchronizer by compressing or removing a number of clock edges within a frame according to mapping/demapping protocols. The timing events of compressing or removing clock edges within a frame can be fixed (synchronous) or random (asynchronous). The gapped clock is derived from the first reference clock, with the fundamental frequency of gapped clock being equal the frequency of the first clock divided by the minimum division or minimum divide (MD). The frame size is the number of clock cycles (n) within a frame, or between two back-to-back Start of Frame (SOF) signals. In some aspects, the SOF signal may be used to indicate the start of a new frame.

As noted above, gapped clock may be asynchronously derived from the first reference clock. As the result, there is no guarantee of a fixed relationship between the first reference clock and the gapped clock. Therefore, it is necessary to acquire the gapped frequency dynamically, as defined by the values DN and DD.

Figure 4:
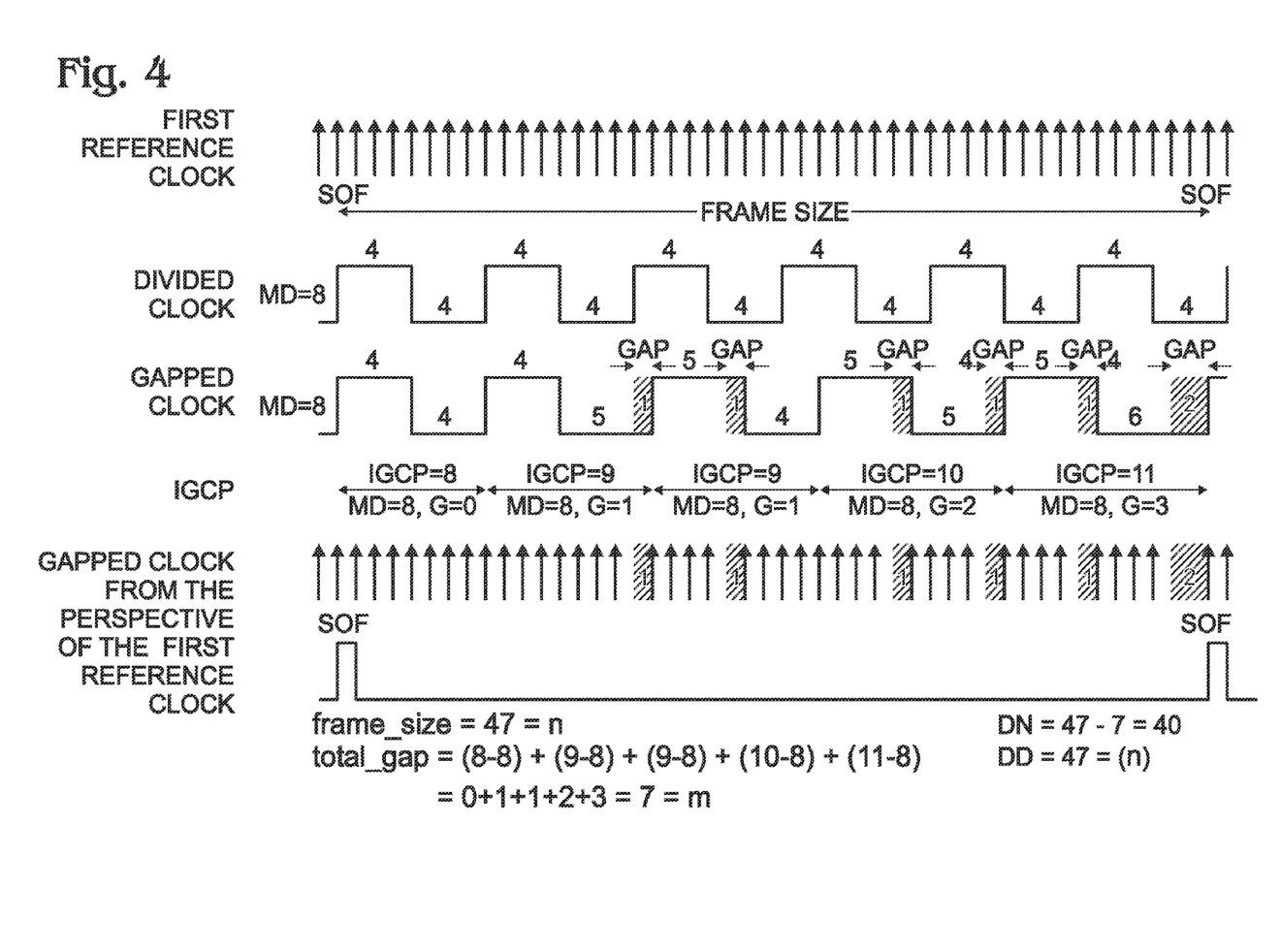
FIG. 4 is a timing diagram depicting the generation of a positive gapped clock.

FIG. 4 is a timing diagram depicting the generation of a positive gapped clock. The divide clock is divided by the minimum divide (MD) period of 8 first reference clock cycles. The divide clock may be used to generate the gapped clock, where a positive gap is asserted into either the duty cycle High or Low of the divide clock. Therefore, each IGCP is extended by a positive gap=IGCP-MD. From the first reference clock's point of view, the gapped clock is created by dropping a number of clock edges, which causes the gapped clock to be slower than the divide clock. By counting the number of gapped clock rising edges in a frame, and knowing the value of (n), the total gap (m) can be calculated. Clearly, the total gap (m) is the sum of the difference between each IGCP and its corresponding MD.

Definition: Dynamic Numerator (DN)=(n)-(m);
Definition: Dynamic Denominator (DD)=(n).

If the synthesizer module (320 of FIG. 3) is enabled as a phase-locked loop (PLL) for example, the divide ratio DN/DD is equal to the second clock frequency divided by the first clock frequency. However, since all the gaps have been filtered/distributed by the averaging module or low pass filter 314, the second clock jitter is very low.

Figure 5:
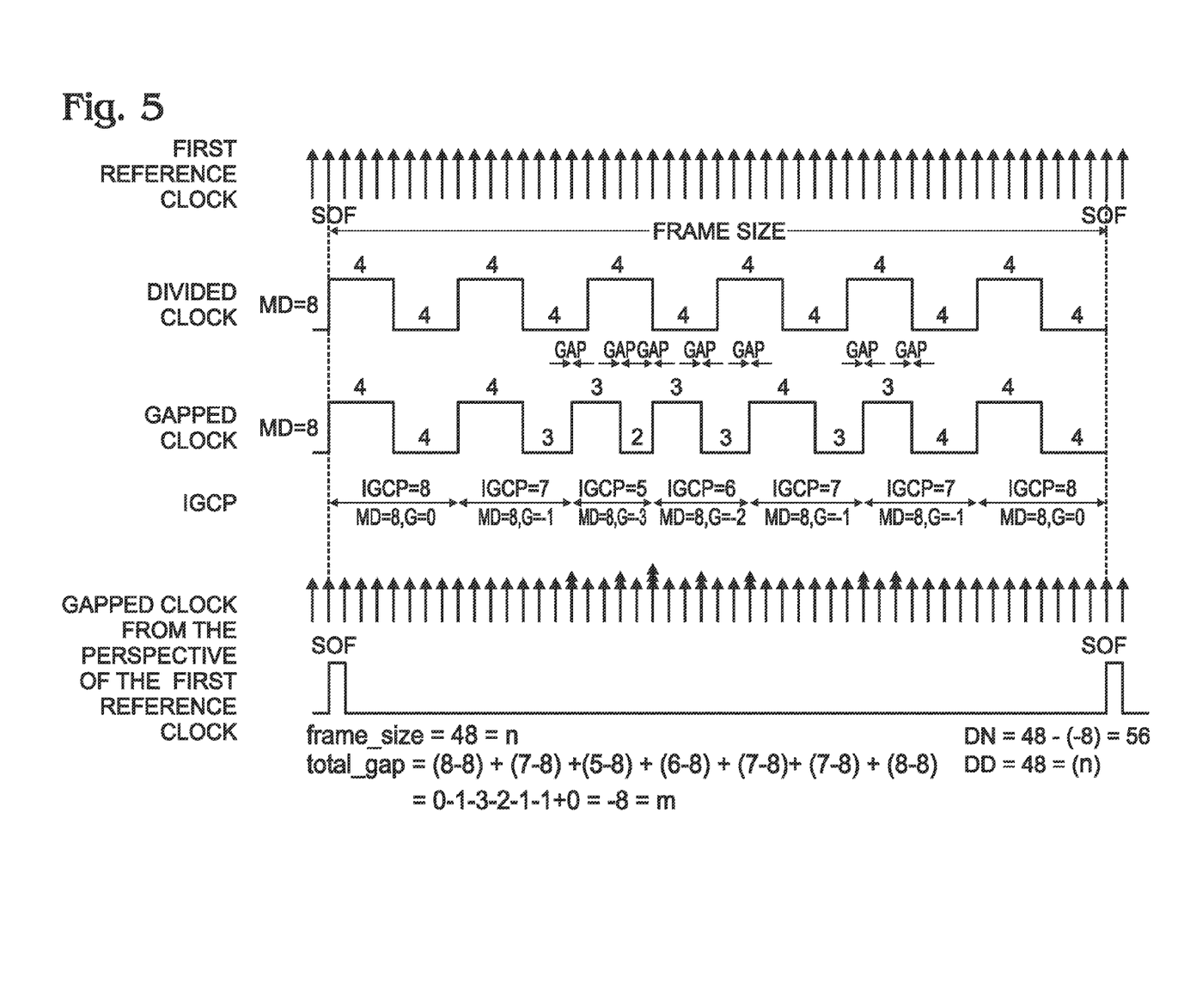
FIG. 5 is a timing diagram depicting the generation of a negative gapped clock.

FIG. 5 is a timing diagram depicting the generation of a negative gapped clock.

Figure 6:
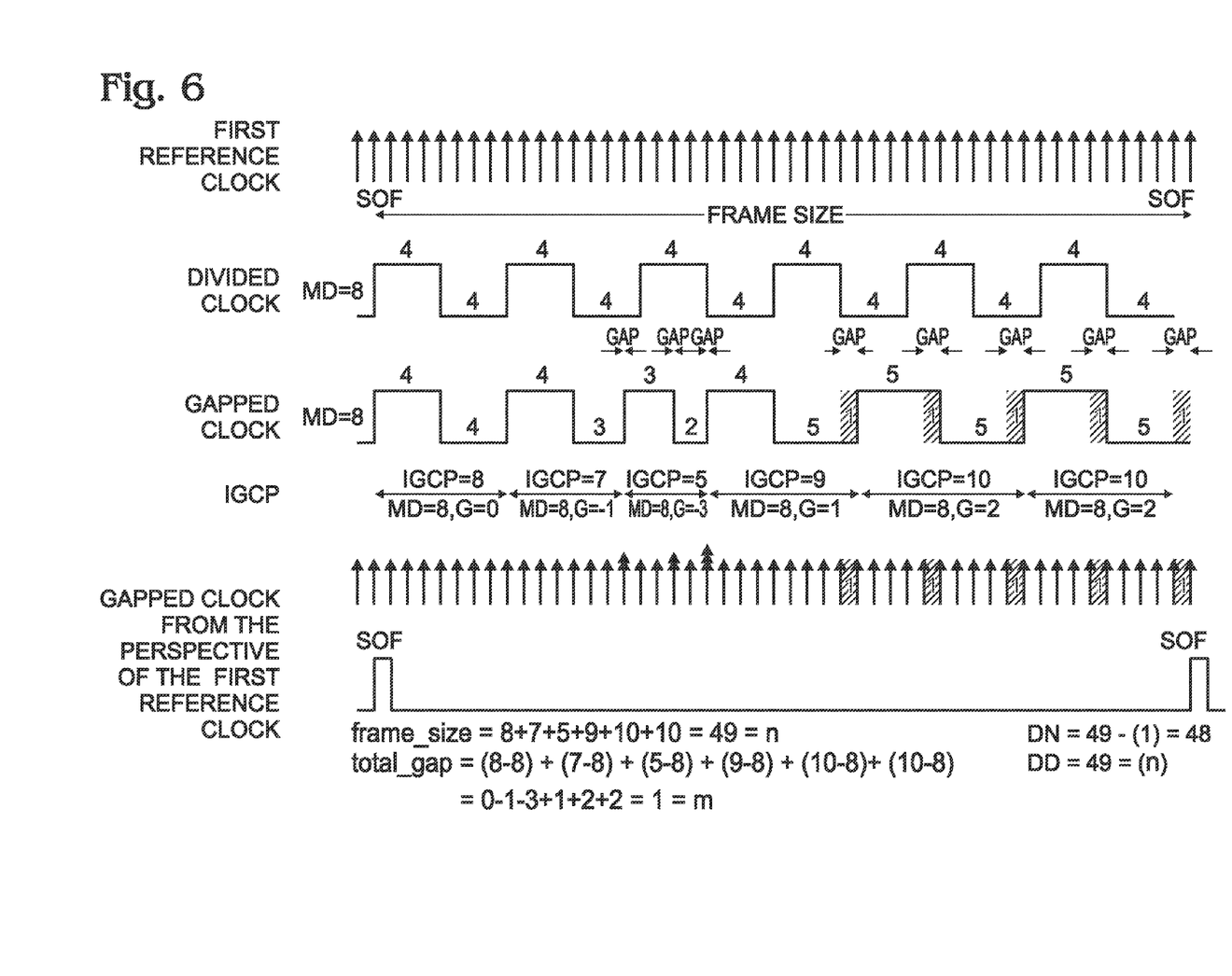
FIG. 6 is a timing diagram depicting the generation of a gapped clock with positive gapped clock and negative gapped clock portions.

FIG. 6 is a timing diagram depicting the generation of a gapped clock with positive gapped clock and negative gapped clock portions.

Figure 7:
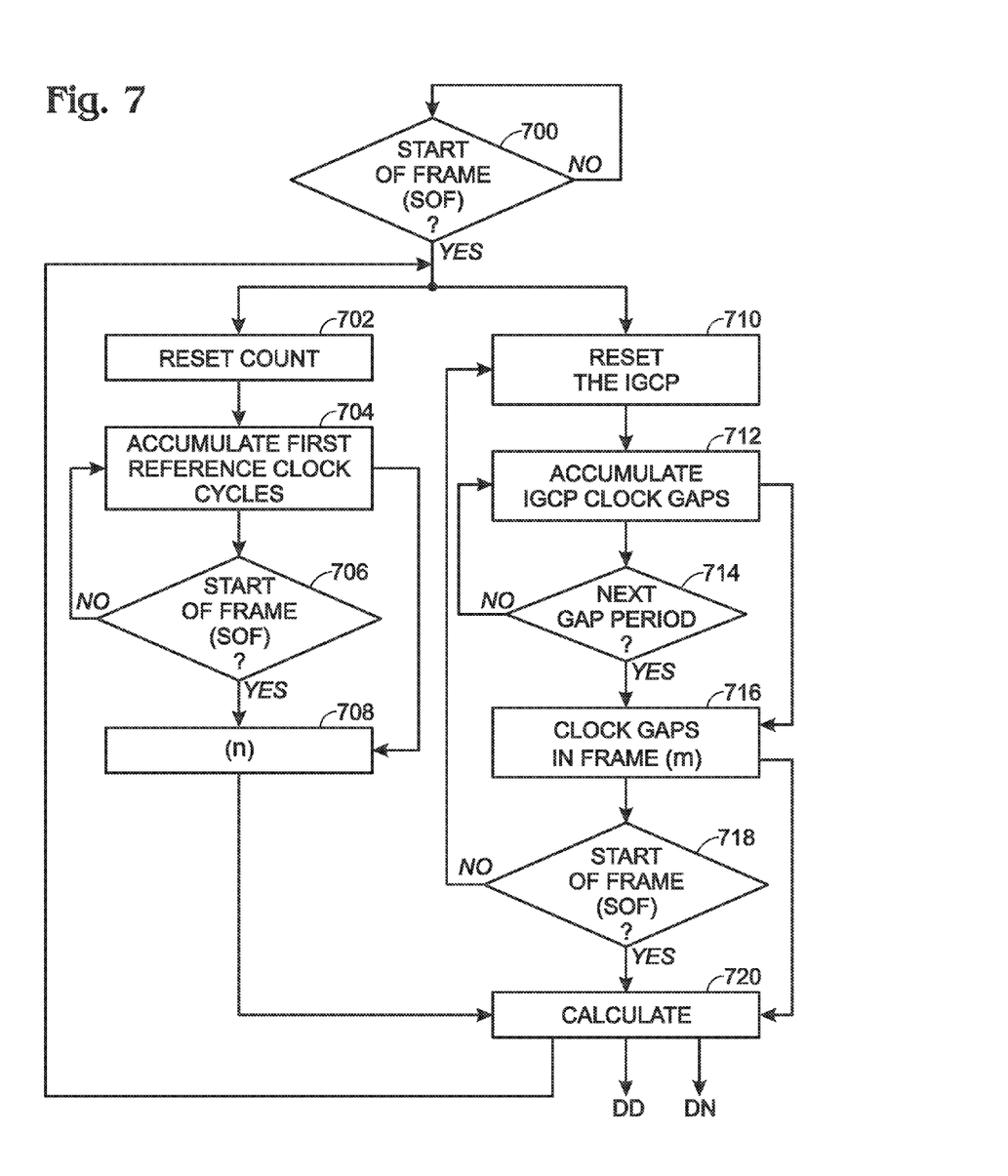
FIG. 7 is a gapped clock frequency acquisition flowchart.

FIG. 7 is a gapped clock frequency acquisition flowchart. The flowchart begins at Step 700. In Step 702 the first reference clock count is reset. In Step 704, a count of first reference clock pulses is accumulated. The count continues to accumulate until an SOF signal is encountered (Step 706). The count (n) is provided in Step 708. Simultaneously in Step 710, the IGCP gap counter is reset. In Step 712 a count of clock gaps is accumulated for each IGCP. The gap count for an entire frame is accumulated in Step 716. After an SOF signal (Step 718), Step 720 determines DD and DN.

Figure 10:
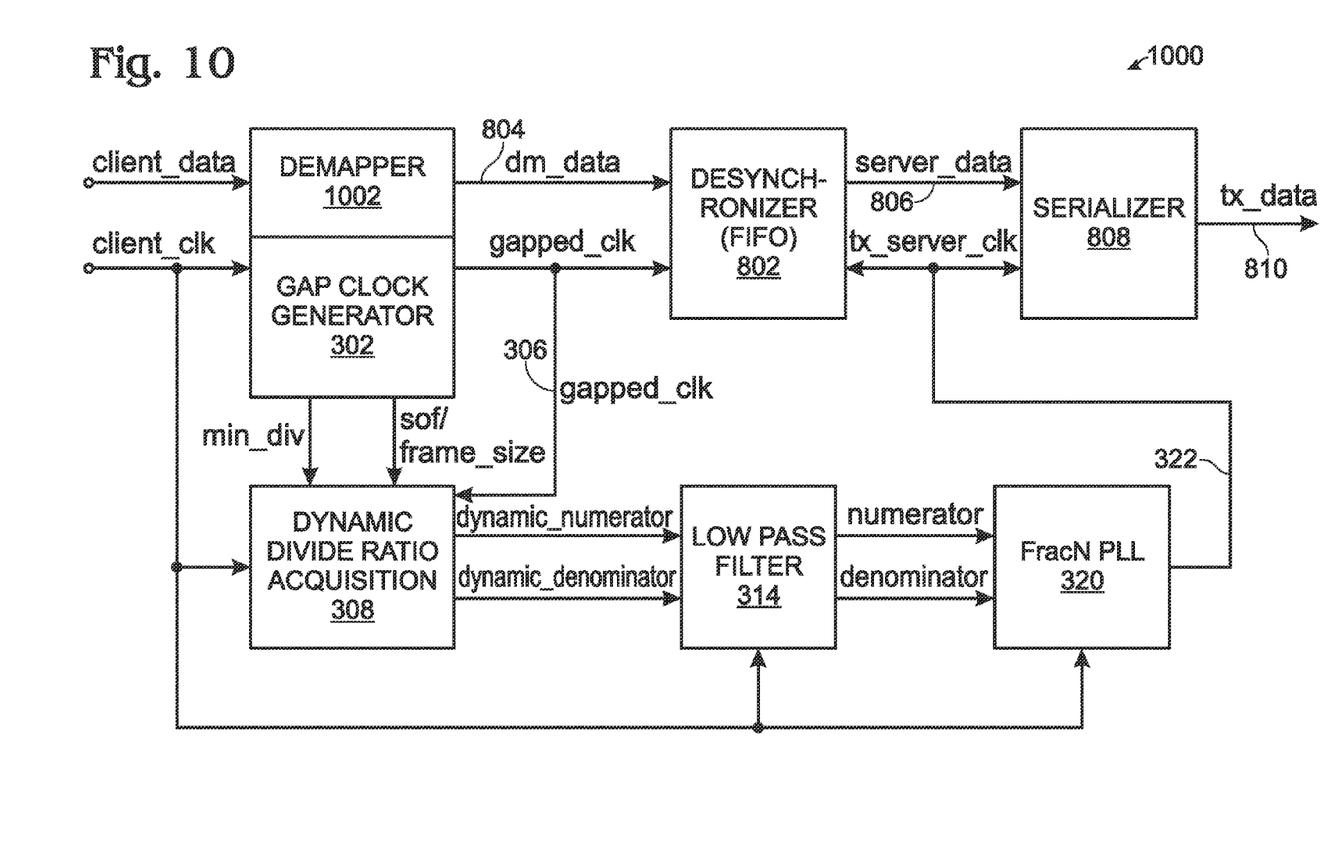
FIG. 10 is a schematic block diagram depicting a feedforward gapped clock desynchronization system with jitter attenuation using a divide ratio FracN phase-locked loop (PLL).

FIG. 10 is a schematic block diagram depicting a feedforward gapped clock desynchronization system with jitter attenuation using a divide ratio FracN phase-locked loop (PLL). The system 1000 includes the following blocks: demapper (DM) 1002, desynchronizer (DS) 802, serializer (SER) 808, dynamic divide ratio acquisition (DDA) 308, low pass filter (LPF) 314, and FracN PLL (FPLL) 320.

The system generates a tx_server_clk (jitter-attenuated second clock) from the FPLL 320. The tx_server_clk frequency is changed according to the numerator and the denominator inputs. The numerator and the denominator are the outputs of DDA block 308, which is used to track the frequency difference between the client_clk (first clock) and the gapped_clk. As the result, the tx_server_clk is then adjusted through the divide ratio of the FPLL accordingly so that the frequency of tx_server_clk is tracked to the rate of demapped data (dm_data) or the gapped_clk frequency.

The demapper 1002 removes bits from client_data, to form dm_data. These removed bits serve multiple purposes in the upstream signal, including FEC code, header/address insertion, and frequency matching. In asynchronous demapping, the difference in frequency between the client_data and dm_data is not fixed, but is dynamic and changes with time. This difference can be acquired by the DDA block with the minimum division (min_div) signal, start of frame (SOF), or frame size. The DDA block 308 generates the dynamic_numerator and dynamic_denominator to the LPF 314. The gapped_clk signal can alternatively be implemented as a uniform clock with a signal with positive gaps. The SOF signal is also optional, and may not be present in some implementations.

The output frequency, tx_server_clk, of FPLL is $$\text{Frequency}[tx_{server_{clk}}] = \frac{\text{numerator}}{\text{denominator}} \times \text{Frequency}[client_{clk}]$$

$$\text{Frequency}[tx_{server_{clk}}] = \frac{\text{numerator}}{\text{denominator}} \times \text{Frequency}[ref_{clk}]$$

Figure 11A:
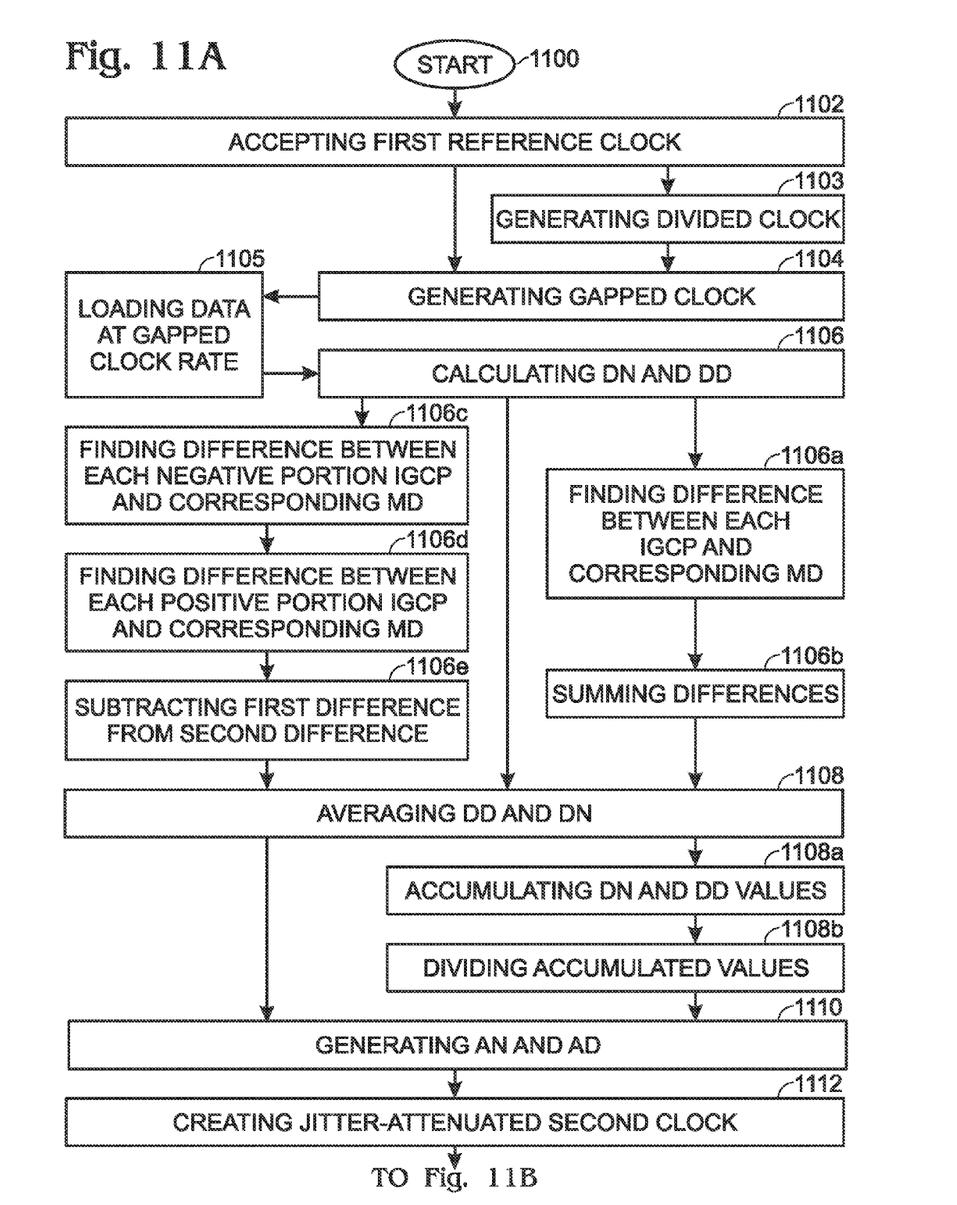
FIGS. 11A and 11B are flowcharts illustrating a method for resynchronizing a transmission signal using a jitter-attenuated clock derived from an asynchronous gapped clock.
Figure 11B:
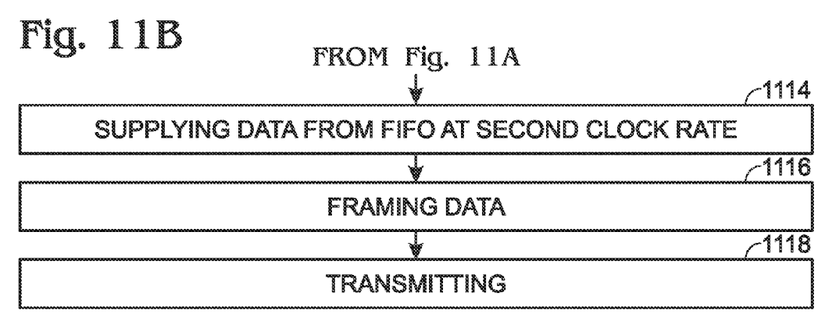

FIGS. 11A and 11B are flowcharts illustrating a method for resynchronizing a transmission signal using a jitter-attenuated clock derived from an asynchronous gapped clock. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally, however, the steps are performed in numerical order. The method starts at Step 1100.

Step 1102 accepts a first reference clock having a first frequency. As noted above, the first reference clock has (n) clock cycles per frame. Using the first reference clock, Step 1104 generates an asynchronous gapped clock having an average second frequency less than the first frequency. In Step 1105 a FIFO memory accepts the gapped clock and loads an input serial stream of data at a rate responsive to the gapped. Step 1106 iteratively calculates a dynamic numerator (DN) and dynamic denominator (DD) for the gapped clock. Step 1108 averages DN and DD. In response to the averaging, Step 1110 generates an averaged numerator (AN) and an averaged denominator (AD). Step 1112 multiplies the first frequency by a ratio AN/AD to create a jitter-attenuated second clock having the second frequency.

In Step 1114 the FIFO memory accepts the jitter-attenuated second clock and supplies data from memory at the second frequency (the rate of the jitter-attenuated second clock). In Step 1116 a framer accepts the data from the FIFO memory and the jitter-attenuated second clock. Step 1118 synchronizes the data with the jitter-attenuated second clock, and transmits a serial stream of output data.

In one aspect, generating the gapped clock in Step 1104 includes dividing (n) by an integer number (x) of instantaneous gap clock periods (IGCPs), where the total number of clock gaps in the (x) IGCPs is (m). In another aspect, averaging DN and DD in Step 1108 includes substeps. Step 1108a accumulates values of DN and DD over a plurality of (s) frames, and Step 1108b divides the accumulated values by (s).

In another aspect, Step 1103 generates a divided clock with a uniform minimum divide period of (MD). Then, iteratively calculating DN in Step 1106 includes calculating:

$$(x)(MD)+(m)=(n), \text{ when } (x)(MD) \geq n; \text{ and,}$$

$$(x)(MD)-(m)=(n), \text{ when } (x)(MD) < n.$$

More explicitly, iteratively calculating DN in Step 1106 includes comparing the difference between (n) and (m) for each frame. Iteratively calculating DD in Step 1106 includes determining (n) for each frame.

In one aspect, Step 1104 generates a positive gapped clock having a lower frequency than the divided clock. Then, calculating the difference between (n) and (m) for each frame (Step 1106) includes substeps. Over the period of a frame, Step 1106a finds a difference in first reference clock pulses between each IGCP and a corresponding MD. Step 1106b sums the differences to obtain the value (m). Likewise, Steps 1106a and 1106b are performed if Step 1104 generates a negative gapped clock.

In another aspect, Step 1104 generates a gapped clock with negative gapped clock portions having a higher frequency than the divided clock, and positive gapped clock periods having a lower frequency than the divided clock. Then over the period of a frame, Step 1106c finds a difference in first reference clock pulses between each negative gapped clock portion IGCP and a corresponding MD, creating a first difference sum. Over the period of the frame, Step 1106d finds a difference in first reference clock pulses between each positive gapped clock portion IGCP and a corresponding MD, creating a second difference sum. Step 1106e subtracts the first difference sum from the second difference sum to obtain the value (m).

Figure 12A:
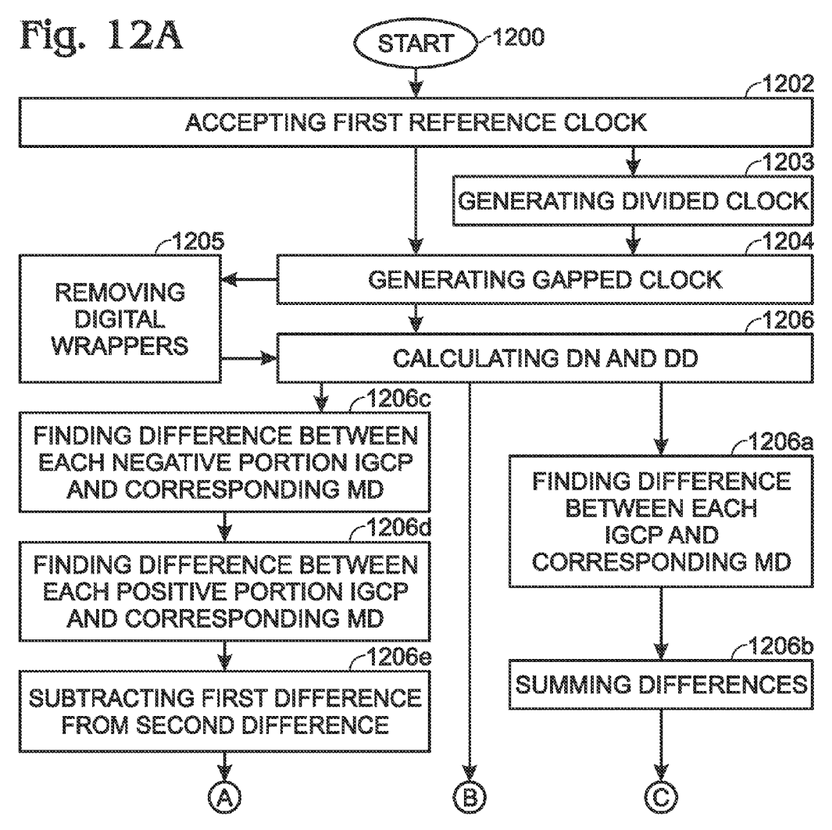
FIGS. 12A and 12B are flowcharts illustrating a method for resynchronizing a received signal using a jitter-attenuated clock derived from an asynchronous gapped clock.
Figure 12B:
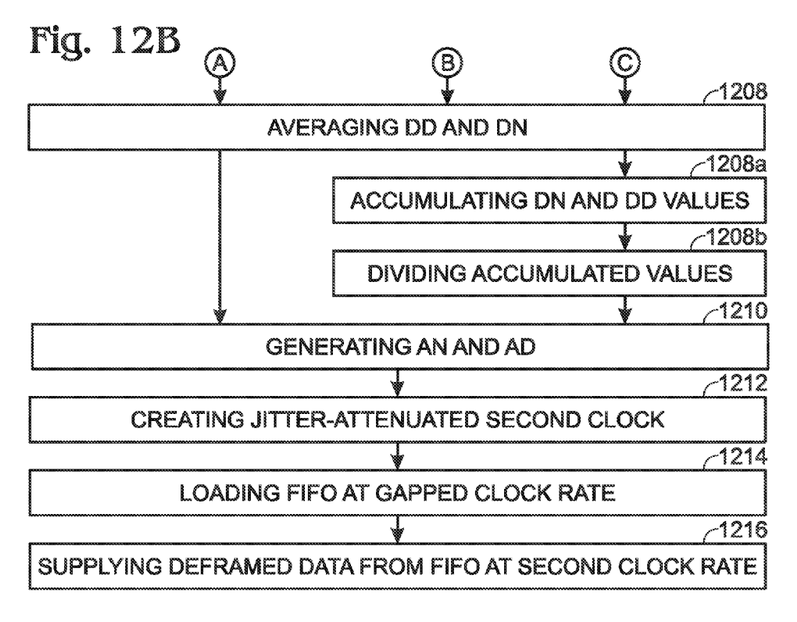

FIGS. 12A and 12B are flowcharts illustrating a method for resynchronizing a received signal using a jitter-attenuated clock derived from an asynchronous gapped clock. The method starts at Step 1200. In Step 1202 a framer accepts a serial stream of data and a first reference clock, having a first frequency, synchronized with the serial stream of data. Using the first reference clock, Step 1204 generates an asynchronous gapped clock having an average second frequency less than the first frequency. In Step 1205 the framer removes digital wrappers from the serial stream of data and supplies deframed data at a rate responsive to the asynchronous gapped clock. Step 1206 iteratively calculates a dynamic numerator (DN) and dynamic denominator (DD) for the gapped clock. Step 1208 averages DN and DD. In response to the averaging, Step 1210 generates an averaged numerator (AN) and an averaged denominator (AD). Step 1212 multiplies the first frequency by a ratio AN/AD to create a jitter-attenuated second clock having the second frequency. In Step 1214 a FIFO memory loads deframed data in response to the asynchronous gapped clock, and in Step 1216 the FIFO memory supplies deframed data from memory at a rate responsive to the jitter-attenuated second clock.

In one aspect, generating the gapped clock in Step 1204 includes dividing (n) by an integer number (x) of instantaneous gap clock periods (IGCPs), where the total number of clock gaps in the (x) IGCPs is (m). In another aspect, averaging DN and DD in Step 1208 includes substeps. Step 1208*a* accumulates values of DN and DD over a plurality of (s) frames, and Step 1208*b* divides the accumulated values by (s).

In another aspect, Step 1203 generates a divided clock with a uniform minimum divide period of (MD). Then, iteratively calculating DN in Step 1206 includes calculating:

$$(x)(MD)+(m)=(n), \text{ when } (x)(MD) \geq n; \text{ and,}$$

$$(x)(MD)-(m)=(n), \text{ when } (x)(MD) < n.$$

More explicitly, iteratively calculating DN in Step 1206 includes comparing the difference between (n) and (m) for each frame. Iteratively calculating DD in Step 1206 includes determining (n) for each frame.

In one aspect, Step 1204 generates a positive gapped clock having a lower frequency than the divided clock. Then, calculating the difference between (n) and (m) for each frame (Step 1206) includes substeps. Over the period of a frame, Step 1206*a* finds a difference in first reference clock pulses between each IGCP and a corresponding MD. Step 1206*b* sums the differences to obtain the value (m). Likewise, Steps 1206*a* and 1106*b* are performed if Step 1204 generates a negative gapped clock.

In another aspect, Step 1204 generates a gapped clock with negative gapped clock portions having a higher frequency than the divided clock, and positive gapped clock periods having a lower frequency than the divided clock. Then over the period of a frame, Step 1206*c* finds a difference in first reference clock pulses between each negative gapped clock portion IGCP and a corresponding MD, creating a first difference sum. Over the period of the frame, Step 1206*d* finds a difference in first reference clock pulses between each positive gapped clock portion IGCP and a corresponding MD, creating a second difference sum. Step 1206*e* subtracts the first difference sum from the second difference to obtain the value (m).

Transmitter and receiver systems and methods have been provided that use a jitter-attenuated clock derived from an asynchronous gapped clock source. Some examples of circuitry and methodology steps have been given as examples to illustrate the invention. However, the invention is not limited to merely these examples. Other variations and embodiments of the invention will occur to those skilled in the art.

We claim:

1. A method for resynchronizing a transmission signal using a jitter-attenuated clock derived from an asynchronous gapped clock, comprising:
using a first reference clock having a first frequency, generating an asynchronous gapped clock having an average second frequency less than the first frequency;
a first-in first-out (FIFO) memory accepting the gapped clock and loading an input serial stream of data at a rate responsive to the gapped clock;
iteratively calculating a dynamic numerator (DN) and dynamic denominator (DD) for the gapped clock;
averaging DN and DD;
in response to the averaging, generating an averaged numerator (AN) and an averaged denominator (AD);
multiplying the first frequency by a ratio AN/AD to create a jitter-attenuated second clock having the second frequency;
the FIFO memory accepting the jitter-attenuated second clock and supplying data from memory at the second frequency;
a framer accepting the data from the FIFO memory and the jitter-attenuated second clock;
synchronizing the data with the jitter-attenuated second clock, and transmitting a serial stream of output data; and
generating a divided clock with a uniform minimum divide period of (MD);
wherein accepting the first reference clock comprises accepting a frame of (n) clock cycles;
generating the asynchronous gapped clock comprises dividing (n) by an integer number (x) of instantaneous gap clock periods (IGCPs), where the total number of clock gaps in the (x) IGCPs is (m); and
iteratively calculating DN comprises calculating:

$$(x)(MD)+(m)=(n), \text{ when } (x)(MD) \geq n; \text{ and,}$$

$$(x)(MD)-(m)=(n), \text{ when } (x)(MD) < n.$$

2. The method of claim 1, wherein averaging DN and DD comprises:
accumulating values of DN and DD over a plurality of (s) frames; and,
dividing the accumulated values by (s).

3. The method of claim 1, wherein iteratively calculating DN comprises
comparing the difference between (n) and (m) for each frame; and,
wherein iteratively calculating DD comprises determining (n) for each frame.

4. The method of claim 1, wherein generating the asynchronous gapped clock comprises generating a positive gapped clock having a lower frequency than the divided clock; and,
wherein calculating the difference between (n) and (m) for each frame comprises:
over the period of a frame, finding a difference in first reference clock pulses between each IGCP and a corresponding MD; and,
summing the differences to obtain the value (m).

5. The method of claim 1, wherein generating the gapped clock comprises generating a negative gapped clock having a higher frequency than the divided clock; and,
wherein calculating the difference between (n) and (m) for each frame comprises:
over the period of a frame, finding a difference in first reference clock pulses between each IGCP and a corresponding MD; and,
summing the differences to obtain the value (m).

6. The method of claim 1, wherein generating the gapped clock comprises generating negative gapped clock portions having a higher frequency than the divided clock, and positive gapped clock periods having a lower frequency than the divided clock; and,
wherein calculating the difference between (n) and (m) for each frame comprises:
over the period of a frame, finding a difference in first reference clock pulses between each negative gapped clock portion IGCP and a corresponding MD, creating a first difference sum;
over the period of the frame, finding a difference in first reference clock pulses between each positive gapped clock portion IGCP and a corresponding MD, creating a second difference sum; and,
subtracting the first difference sum from the second difference to obtain the value (m).

7. A method for resynchronizing a received signal using a jitter-attenuated clock derived from an asynchronous gapped clock, comprising:
a framer accepting a serial stream of data and a first reference clock having a first frequency, synchronized with the serial stream of data;
using the first reference clock, generating an asynchronous gapped clock having an average second frequency less than the first frequency;
the framer removing digital wrappers from the serial stream of data and supplying deframed data at a rate responsive to the asynchronous gapped clock;
iteratively calculating a dynamic numerator (DN) and dynamic denominator (DD) for the gapped clock;
averaging DN and DD;
in response to the averaging, generating an averaged numerator (AN) and an averaged denominator (AD);
multiplying the first frequency by a ratio AN/AD to create a jitter-attenuated second clock having the second frequency;
a first-in first-out (FIFO) memory loading deframed data in response to the asynchronous gapped clock;
the FIFO memory supplying deframed data from memory at a rate responsive to the jitter-attenuated second clock; and
generating a divided clock with a uniform minimum divide period of (MD);
wherein accepting the first reference clock comprises accepting a frame of (n) clock cycles;
generating the asynchronous gapped clock comprises dividing (n) by an integer number (x) of instantaneous gap clock periods (IGCPs), where the total number of clock gaps in the (x) IGCPs is (m); and
iteratively calculating DN comprises calculating:

$(x)(MD)+(m)=(n)$, when $(x)(MD) \geq n$; and, $(x)(MD)-(m)=(n)$, when $(x)(MD)<n$.

8. The method of claim 7, wherein averaging DN and DD comprises:
accumulating values of DN and DD over a plurality of (s) frames; and,
dividing the accumulated values by (s).

9. The method of claim 7, wherein iteratively calculating DN comprises comparing the difference between (n) and (m) for each frame; and,
wherein iteratively calculating DD comprises determining (n) for each frame.

10. The method of claim 7, wherein generating the asynchronous gapped clock comprises generating a positive gapped clock having a lower frequency than the divided clock; and,
wherein calculating the difference between (n) and (m) for each frame comprises:
over the period of a frame, finding a difference in first reference clock pulses between each IGCP and a corresponding MD; and,
summing the differences to obtain the value (m).

11. The method of claim 7, wherein generating the gapped clock comprises generating a negative gapped clock having a higher frequency than the divided clock; and,
wherein calculating the difference between (n) and (m) for each frame comprises:
over the period of a frame, finding a difference in first reference clock pulses between each IGCP and a corresponding MD; and,
summing the differences to obtain the value (m).

12. The method of claim 7, wherein generating the gapped clock comprises generating negative gapped clock portions having a higher frequency than the divided clock, and positive gapped clock periods having a lower frequency than the divided clock; and,
wherein calculating the difference between (n) and (m) for each frame comprises:
over the period of a frame, finding a difference in first reference clock pulses between each negative gapped clock portion IGCP and a corresponding MD, creating a first difference sum;
over the period of the frame, finding a difference in first reference clock pulses between each positive gapped clock portion IGCP and a corresponding MD, creating a second difference sum; and,
subtracting the first difference sum from the second difference to obtain the value (m).

13. A framer system for transmitting a signal using a jitter-attenuated clock derived from an asynchronous gapped clock, comprising:
a gap clock generator having an input to accept a first reference clock with a first frequency, and having an output to supply an asynchronous gapped clock having an average second frequency less than the first frequency;
a first-in first-out (FIFO) memory having input interfaces to accept a serial stream of data and the gapped clock, the FIFO memory loading the serial stream of data at a rate responsive to the gapped clock;
a gap frequency acquisition module having an input to accept the gapped clock, the gap frequency acquisition module having outputs to supply an iteratively calculated dynamic numerator (DN) and an iteratively calculated dynamic denominator (DD) for the gapped clock;
an averaging module having inputs to accept the DN and DD, and having outputs to supply an averaged numerator (AN) and an averaged denominator (AD);
a synthesizer module having inputs to accept AN, AD, and the first frequency clock, the synthesizer module multiplying the first frequency by a ratio AN/AD to supply a jitter-attenuated second clock having the second frequency;
wherein the FIFO memory has an input interface to accept the jitter-attenuated second clock and an output interface to supply data from memory at a rate responsive to the second clock frequency;
the framer system further comprising:
a serializer having an input interface to accept the jitter-attenuated second clock and data from the FIFO memory, the serializer synchronizing the data with the jitter-attenuated second clock, adding digital wrappers, and transmitting a serial stream of output data at an output interface; and
a module for generating a divided clock with a uniform minimum divide period of (MD);
wherein the gap frequency acquisition module accepts the first reference clock and accepts a frame of (n) clock cycles;
the asynchronous gapped clock divides (n) by an integer number (x) of instantaneous gap clock periods (IGCPs), where the total number of clock gaps in the (x) IGCPs is (m); and the gap frequency acquisition module iteratively calculated DN comprises:

$(x)(MD)+(m)=(n)$, when $(x)(MD) \geq n$; and, $(x)(MD)-(m)=(n)$, when $(x)(MD) < n$.

14. A gapped clock receiver system for resynchronizing a received signal using a jitter-attenuated clock derived from an asynchronous gapped clock, comprising:
- a framer having input interfaces to accept a first reference clock having a first frequency, a serial stream of data, and an asynchronous gapped clock having an average second frequency less than the first frequency, the framer removing digital wrappers from the serial stream of data and supplying deframed data at an output interface at a rate responsive to the gapped clock;
- a gap clock generator having an input to accept the first reference clock and having an output to supply the gapped clock;
- a gap frequency acquisition module having an input to accept the gapped clock, the gap frequency acquisition module having outputs to supply an iteratively calculated dynamic numerator (DN) and an iteratively calculated dynamic denominator (DD) for the gapped clock;
- an averaging module having inputs to accept the DN and DD, and having outputs to supply an averaged numerator (AN) and an averaged denominator (AD);
- a synthesizer module having inputs to accept AN, AD, and the first frequency clock, the synthesizer module multiplying the first frequency by a ratio AN/AD to supply a jitter-attenuated second clock having the second frequency;
- a first-in first-out (FIFO) memory having input interfaces to accept the deframed data and first clock, and to load the deframed data at a rate responsive to the first frequency, the FIFO memory having output interfaces to accept the jitter-attenuated second clock and supply deframed data from memory at a rate response to the jitter-attenuated second clock; and
- a module for generating a divided clock with a uniform minimum divide period of (MD);
- wherein the gap frequency acquisition module accepts the first reference clock and accepts a frame of (n) clock cycles;
- the asynchronous gapped clock divides (n) by an integer number (x) of instantaneous gap clock periods (IGCPs), where the total number of clock gaps in the (x) IGCPs is (m); and
- the gap frequency acquisition module iteratively calculated DN comprises:

$(x)(MD)+(m)=(n)$, when $(x)(MD) \geq n$; and, $(x)(MD)-(m)=(n)$, when $(x)(MD) < n$.

* * * * *